(12) United States Patent
Bilal et al.

(10) Patent No.: US 9,508,040 B2
(45) Date of Patent: Nov. 29, 2016

(54) PREDICTIVE PRE-LAUNCH FOR APPLICATIONS

(71) Applicant: Microsoft Technology Licensing, LLC, Redmond, WA (US)

(72) Inventors: Ahmad Bilal, Bellevue, WA (US); Mehmet Iyigun, Kirkland, WA (US); Milos Kralj, Bellevue, WA (US); Christopher Kleynhans, Redmond, WA (US); Hari Pulapaka, Redmond, WA (US); Arun Kishan, Kirkland, WA (US); Asela Gunawardana, Seattle, WA (US); Paul Koch, Redmond, WA (US); Christopher Meek, Kirkland, WA (US); Eric Horvitz, Kirkland, WA (US); Rich Caruana, Redmond, WA (US); Michael Fortin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 368 days.

(21) Appl. No.: 13/915,870

(22) Filed: Jun. 12, 2013

(65) Prior Publication Data

US 2014/0372356 A1    Dec. 18, 2014

(51) Int. Cl.
*G06F 9/445* (2006.01)
*G06F 9/48* (2006.01)
*G06N 5/02* (2006.01)

(52) U.S. Cl.
CPC .................. *G06N 5/02* (2013.01); *G06F 9/445* (2013.01); *G06F 9/44578* (2013.01); *G06F 9/485* (2013.01)

(58) Field of Classification Search
CPC ..... G06N 5/02; G06F 9/445; G06F 9/44578; G06F 9/48; G06F 9/485
See application file for complete search history.

(56) References Cited

U.S. PATENT DOCUMENTS

| 8,176,437 | B1 | 5/2012 | Taubman |
| 2004/0030882 | A1 | 2/2004 | Forman |
| 2004/0193813 | A1 | 9/2004 | Nguyen |
| 2005/0204198 | A1 | 9/2005 | Pagen |

(Continued)

OTHER PUBLICATIONS

Definition of "physical". From www.merriam-webster.com/dictionary/physical. Accessed Apr. 28, 2016.*

(Continued)

*Primary Examiner* — Stanley K Hill
*Assistant Examiner* — Benjamin Buss
(74) *Attorney, Agent, or Firm* — John Jardine; Raghu Chinagudabha; Micky Minhas

(57) ABSTRACT

Systems and methods of pre-launching applications in a computer system, said applications being likely to be activated by a user from a terminated and/or suspended process state, are disclosed. The pre-launching of an application may be based on the assessed probability of the application being activated—as well as the level of availability of system resources to affect such pre-launching. Applications may be pre-launched based on these and other conditions/considerations, designed to improve the user's experience of a quick launch of applications in the background. Several prediction models are presented to provide a good estimate of the likelihood of an application being activated by a user. Such prediction models may comprise an adaptive predictor (based on past application usage situations) and/or a switch rate predictor (based on historic data of an application being switched and, possibly, having a decay rate applied to such switch rate measure).

20 Claims, 7 Drawing Sheets

(56) References Cited

U.S. PATENT DOCUMENTS

| | | | |
|---|---|---|---|
| 2006/0053219 A1* | 3/2006 | Kutsumi et al. | 709/224 |
| 2012/0023226 A1* | 1/2012 | Petersen | H04W 4/028 709/224 |
| 2012/0324481 A1 | 12/2012 | Xia et al. | |
| 2013/0152047 A1* | 6/2013 | Moorthi et al. | 717/124 |
| 2013/0173513 A1* | 7/2013 | Chu et al. | 706/14 |

OTHER PUBLICATIONS

Definition of "physical". From Google search of "define:physical" performed Apr. 28, 2016.*

Yan, et al., "Fast App Launching for Mobile Devices Using Predictive User Context", In Proceedings of the 10th International Conference on Mobile Systems, Applications, and Services, Jun. 25, 2012, 14 pages.

"To Pre-Launch Applications to User Devices", Retrieved on: Apr. 17, 2013, Available at: http://knowcitrix.hpage.co.In/prelaunch_98002972.html#.UW06SrWnrxo.

Joo, et al., "FAST: Quick Application Launch on Solid-State Drives", In Proceedings of the 9th USENIX Conference on File and Stroage Technologies, Feb. 15, 2011, 14 pages.

Richards, Josh, "Windows 8 Development—Process Lifetime Management", Published on: Dec. 18, 2012, Available at: http://community.dynamics.com/ax/b/meritmatters/archive/2012/12/18/windows-8-development-process-lifetime-management.aspx#.UW1BzLWnrxo.

Williams, Mike, "App-Compactor can Speed Up the Launch Time of Portable Apps", Published on: Jan. 19, 2012, Available at: http://www.softwarecrew.com/2012/01/appcompactorcan-speed-up-the-launch-time-of-portable-apps/.

Green, Travis, "Google Prediction API helps all Apps to Adapt and Learn", Published on: May 10, 2011, Available at: http://googlecode.blogspot.in/2011/05/google-prediction-api-helps-all-apps-to.html.

PCT/US2013/061047, International Search Report and Written Opinion of the International Searching Authority, Jan. 30, 2014.

* cited by examiner

PREDICTIVE PRE-LAUNCH FOR APPLICATIONS

BACKGROUND

Launching applications is an expensive operation due to the resources used during initialization. This problem may be further aggravated with the popularity of low-cost devices which may tend to have more hardware constraints than traditional desktops. In the past, solutions like caching have been used to speed up application launches. While these solutions improve the launch time of applications, they may not be sufficient to give users adequate response or desired performance and may be less effective when cache space is limited.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Systems and methods of pre-launching applications in a computer system, said applications being likely to be activated by a user from a terminated and/or suspended process state, are disclosed. The pre-launching of an application may be based on the assessed probability of the application being activated—as well as the level of availability of system resources to affect such pre-launching. Applications may be pre-launched based on these and other conditions/considerations, designed to improve the user's experience of a quick launch of applications in the background. Several prediction models are presented to provide a good estimate of the likelihood of an application being activated by a user. Such prediction models may comprise an adaptive predictor (based on past application usage situations) and/or a switch rate predictor (based on historic data of an application being switched and, possibly, having a decay rate applied to such switch rate measure).

In one embodiment, a method for pre-launching applications within a computer system is disclosed. The method may comprise the steps of: for a given set of applications, said applications capable of being activated by a user of the computer system, associating a prediction of when said applications may be activated by said user with said application; monitoring system resources of said computer system; applying a set of pre-launch rules to said set of applications, said pre-launch rules comprising one of a group, said group comprising: rules regarding availability of said system resources and rules regarding said predictions associated with said applications; and pre-launching one said application, based upon the satisfaction of said set of pre-launch rules.

In another embodiment, a system for pre-launching applications on a computer system is disclosed. The system may comprise: a prediction engine, said prediction engine capable of providing a prediction measure of likelihood that a given application may be activated by a user of said computer system; a resource monitor, said resource monitor capable of providing a measure of system resource utilization of said computer system; a pre-launch policy module, said pre-launch policy module capable of applying a set of pre-launch policy rules, said pre-launch policy rules comprising one of a group, said group comprising: rules regarding availability of said system resources and rules regarding said prediction measures associated with said applications; and a pre-launch queue module, said pre-launch queue module capable of maintaining a list of applications for pre-launching in said computer system, said list of applications depending upon the satisfaction of said pre-launch policy rules.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
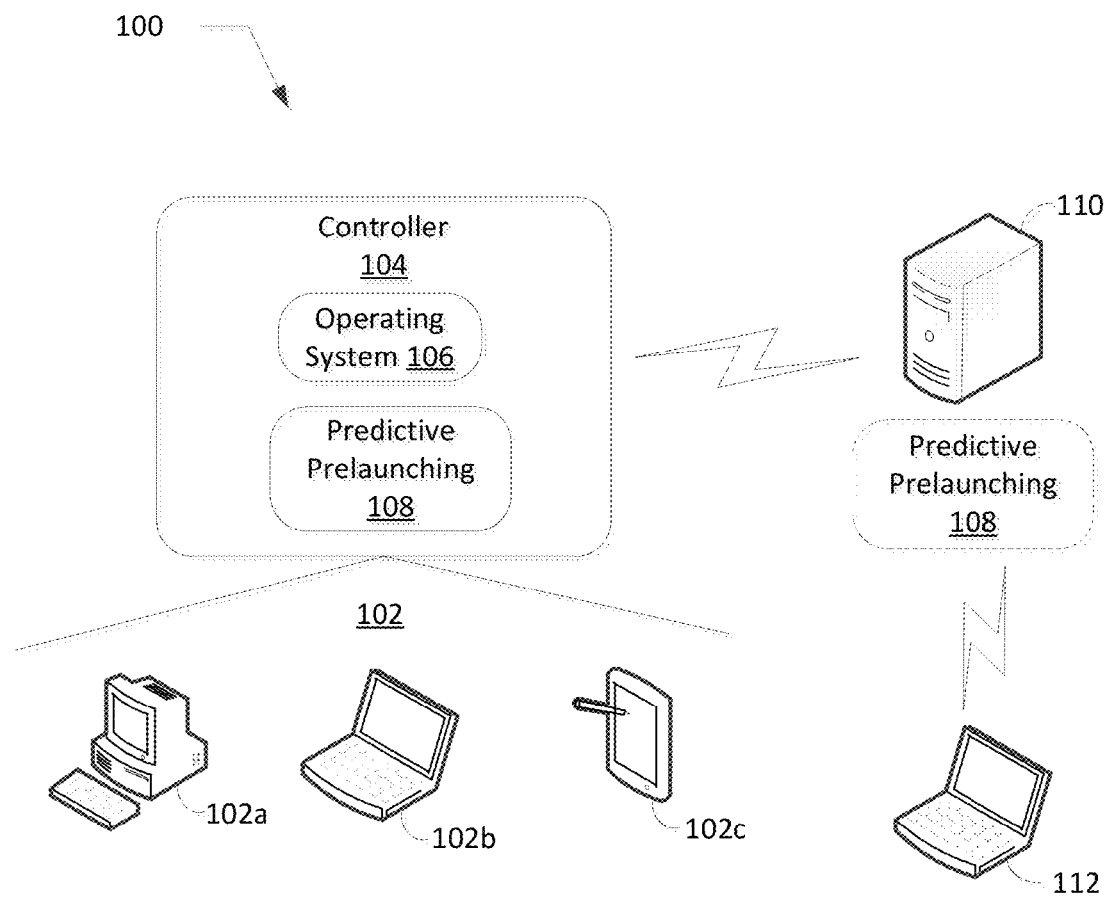
FIG. 1 depicts a number of exemplary environments in which present system may reside in made in accordance with the principles of the present application.

As utilized herein, terms "component," "system," "interface," "controller" and the like are intended to refer to a computer-related entity, either hardware, software (e.g., in execution), and/or firmware. For example, any of these terms can be a process running on a processor, a processor, an object, an executable, a program, and/or a computer. By way of illustration, both an application running on a server and the server can be a component and/or controller. One or more components/controllers can reside within a process and a component/controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Overview of Predictive Pre-launch

In many embodiments, it is desirable for an operating system to provide a fast and fluid user experience. As mentioned, one area where this aspiration isn't fully realized is the launch time of modern apps. One possible embodiment affects the following—since launching an app tends to be more expensive than switching to a suspended app, preloading an app before it is launched by a user (and possibly placing it in to the suspended state) may tend to improve the perceived startup performance of an app. In another embodiment, it may be desirable for the present system to make the right choices when terminating apps—as a way to potentially reduce the instances of expensive fresh app launches. In addition, it may be desirable to have these features working transparently to the user—e.g., the user may merely notice the improved performance without any (or many) implementation details.

In considering the various embodiments of predictive pre-launch herein, it should be appreciated that the methods and techniques of predictive pre-launch may be employed in a number of different scenarios. In some scenarios, the present system may perform its predictive pre-launch for individual application—e.g., considered one at a time. In other situations, the present system may consider sets of related applications. For example, the following is a partial listing of examples of user applications and manners in which the present system may employ the techniques of the present application:

(1) Groups of apps that are typically used together regardless of specific order—e.g., office applications (e.g., word processor, presentation software, spreadsheet software etc.).

(2) Apps that are typically used in a certain sequence: news app followed by the browser, email app followed by the photo editor or pdf viewer, etc.

(3) Apps that are typically used at certain times-of-day or days of week: checking news, email, weather, traffic in the morning before going to work, checking email/IM after coming back from meetings/lunch (meetings are generally repetitive from week to week), checking for traffic before leaving work at 6 pm, checking for weekend weather before leaving work on Friday, checking news/sports at home in the evenings, checking user's calendars etc.

(4) Apps that are used at regular intervals: checking for news/stocks every day during the lunch hour.

(5) Location-specific app usage (e.g., gathered via GPS/Wi-Fi, user input etc.): tablet is used for work at work, but for kids' games at home.

(6) Apps used in response to certain events in the computer: Using the email app and the IM app after logon or after waking the computer from sleep.

Exemplary Environment

FIG. 1 is one embodiment of a few exemplary environments in which predictive pre-launching may reside. As may be seen in FIG. 1, embodiments of the present system may be installed within a computer system 102. Suitable computer systems may comprise any number of systems—e.g., PCs/desktops 102a, laptop 102b, tablets 102c, or any smart device, smart phone. It may suffice that the system has sufficient processing and memory capabilities to run the present system.

Computer systems 102 may further comprise controller 104 which may in turn have one or more processors (e.g., a CPU and/or GPU) and computer memory, as is known in the art. Computer system 102 may further have operating system 106 installed in memory and working to control the lifecycles of various apps that may be activated by users of the computer system.

One embodiment of the present application may have installed Predictive Pre-launching 108 module which may work in conjunction with operating system 106 to affect the methods and techniques of the present systems and their various embodiments, as described herein.

In other embodiments of the present system (and as will be discussed in greater detail below), predictive pre-launching may be installed (in whole or in parts) remotely from any particular computer system. As shown in FIG. 1, modules of predictive pre-launching may be accessible to computer systems via a server 110 in a client-server model (or any other suitable model). As will be discussed below, if certain data and/or metadata concerning a user's usage patterns of apps may be shared remotely, then the effects of any one user's predictive pre-launching may follow and/or migrate to any other computer system 112—which the user may own and/or access.

One Embodiment

Figure 2:
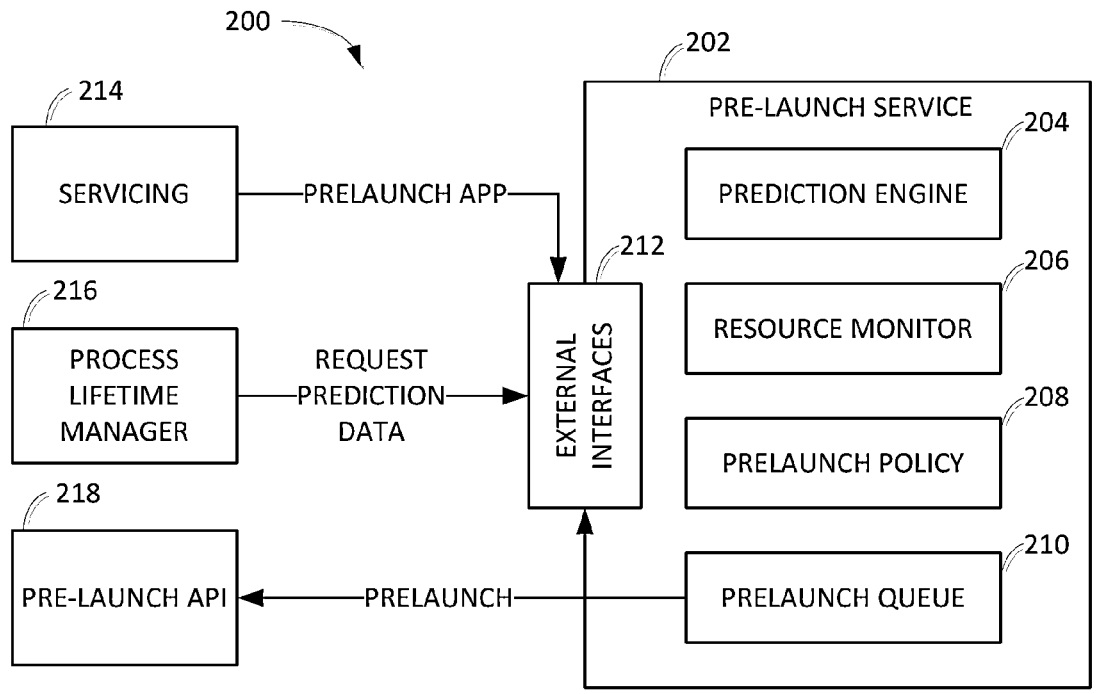
FIG. 2 shows one embodiment of the present system as made in accordance with the principles of the present application.

FIG. 2 depicts one possible embodiment of a present system as made in accordance with the principles of the present application.

System 200 comprises a number of (possibly optional) modules that may reside in an operating system, running on a processor within a computer system (e.g., smart phone, smart device, tablet, laptop, desktop or the like). In an alternative embodiment, some (or all) of these modules may reside apart from the operating system—but in communication with the operating system of a computer system. It should be appreciated that there are a number of possible implementations of the present system and that the scope of this present application encompasses all such possible implementations and/or embodiments.

Pre-launch services module 202 comprises a set of processing modules—e.g., prediction engine 204, resource monitor 206, pre-launch policy 208 and pre-launch queue 210. Prediction engine 204 may comprise a set of rules and/or heuristics that may aid the present system to assess the probability of a particular application may be required and/or desired to be running by a user of the computer system—as described in greater detail herein. Prediction engine may associate a prediction of when any given application may be activated by the user.

It should be appreciated that the prediction associated with the application may comprise the form of any known data structure and/or metadata structure. It may suffice that the prediction may be utilized by the present system to aid in making decisions on which application may be pre-launched—if there is a satisfaction of some suitable set of rules/heuristics for pre-launching. These rules may comprise monitoring and/or testing of available system resources and/or pre-launch policy rules/heuristics, as will be discussed further herein.

Resource monitor 206 may assess the utilization of the computer system's resources—e.g., the currently available processing and/or memory resources for the potential pre-launching of applications. Pre-launch policy 208 may inform the present system as to the rules and/or heuristics for when the present system may desirably pre-launch one or more applications. Pre-launch queue 210 may access a set of data and/or metadata regarding applications that may have been pre-launched and/or are desired to be pre-launched.

It will be appreciated that one or more of these modules may be optional for the purposes of the present application. It may suffice that the present system be capable of determining which applications are "good" candidates for pre-launching—e.g., whether because of the probability of being selected by a user, because of available resources to pre-launch an app, because the rules and/or heuristics have selected a particular app for pre-launching—or any combination of the above factors.

These modules may be accessed via a set of external interfaces and/or APIs 212—e.g., that allow other modules to access the present system. For example, servicing 214 may send signals to system 202 that identify apps that have pre-launched. In one embodiment, the servicing system 214 may only send notifications of app updates, app installs and requests to pre-launch an app to system 202. The servicing component may have no knowledge of which apps have pre-launched and thus it may not be able to identify such apps to system 202. Process Lifetime Manager (PLM) 216 may request prediction data for possible apps to consider for pre-launching. In addition, PLM may request prediction data to make memory management or termination decisions. Pre-Launch API 218 may receive signals from system 202 to pre-launch particular apps. In one embodiment, the PLM may be responsible for deciding the current app execution state for any app—as well as deciding which apps should remain in memory (suspended) vs. terminated.

In another embodiment, it may be possible that the prelaunch service receives messages from other components in the system about application installation, servicing and usage to drive its own prelaunch decisions. In addition, other system components may request application usage prediction data to drive their own management decisions (e.g., as with PLM and app termination).

Figure 3:
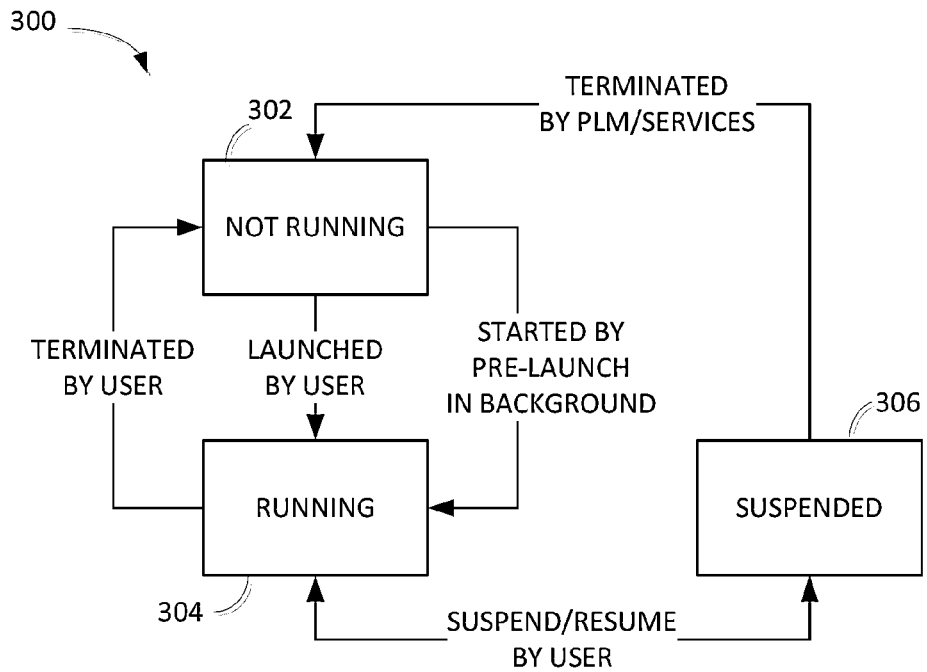
FIG. 3 is one embodiment of a state diagram for applications in which predictive pre-launching is possible.

FIG. 3 depicts one state diagram 300 for an app, as the present system may affect during the lifecycle of the app. In general, an app running and/or available to the computer system may comprise a plurality of process states—e.g., Not Running 302, Running 304 and/or Suspended 306. As may be seen, if an app is in Not Running state 302, then the app may be induced to Running State 304 in a number of different ways. For example, the app may be launched by the user. In another example, the app may be pre-launched by the present system, depending upon the data/metadata—and/or the satisfaction of rules/heuristics of the present system that determine whether a given app should be pre-launched.

When an app is in the Running state 304, then the app may be placed into the Suspended state 306 by a suitable user of the computer system. In addition, a Running app may be terminated by such a suitable user of the computer system. These transitions may be affected in whole or part by the present system. If an app is in Suspended state 306, then the app in question may be resumed by a suitable user—or may be terminated, e.g., by resource policy and/or Servicing modules.

As may be seen, the present system may allow a terminated app (e.g., in Not Running state 302) to be pre-launched in background. In one embodiment, this pre-launched, terminated app may be transitioned into the Suspended state 306 and made ready to resume—as the path to Running state 304.

It should be appreciated that for the purposes of the present application, that pre-launch may not require that the system support a "suspended" state for applications. Pre-launch is possible for systems that only have Running/Not Running states for apps.

In one embodiment, throttling may be enabled for the app being activated by pre-launch. If the app was previously terminated by user, it may be activated by pre-launch to its initial state and —in one scenario, a splash screen may appear momentarily when the app is activated. If the app was terminated by PLM, it may be activated by pre-launch to its last saved state with its previous graphical cues intact and/or with its backstack location restored. If the app is already present in the suspended state, pre-launch may ignore it. In some embodiments, when pre-launching an app in the background, it may not be desirable to interfere with user activity and as such, the pre-launched app may be assigned low resource priorities (e.g., CPU, I/O, GPU, memory resources).

In one embodiment, when an application is pre-launched, it may be notified that this activation is due to a pre-launch—as opposed to user activation. During pre-launch, the app may not be visible. For example, pre-launches may occur in the background, not the foreground. In addition, for a fixed period of time after the pre-launch occurs, the app may be suspended. In addition, it may be desirable to allow an application to detect that it is being pre-launched so that, e.g. —the app may alter its behavior, if desired.

New App Lifecycle Embodiment and Model

As mentioned, there may be rules and/or heuristics that inform the present system to pre-launch any particular app. In one embodiment, it is possible to introduce a new app lifecycle model for modern apps. For example, as opposed to terminating an app and later re-launching the app, it may be desirable to apply rules and/or heuristics when a particular app should be suspended and resumed after the first launch. In one embodiment, the system may apply the following rules and/or heuristics for substituting typical termination scenarios with possible pre-launch opportunities.

| TERMINATION SCENARIO | PRE-LAUNCH OPERATIONS |
| --- | --- |
| Restarting the computer system terminates all currently running apps. | Pre-launch the apps most likely to be launched after a re-boot. |
| Servicing terminates an app to install updates. | Pre-launch the app after update. |
| Process Lifetime Manager (PLM) terminates an app to free up system resources. | Prevent PLM from terminating an app that is likely to be used. |
| User manually terminates an app. | Pre-launch the app if it is likely to be launched in the near future. |

Another termination scenario occurs when a running app crashes. In this case, there may be many possible alternatives to consider. For example, it may be undesirable to pre-launch/relaunch the app, if the app is likely to crash once again. This may put the computer system into an application restart loop. In such cases, it may be possible to: (1) pre-launch an app that crashed when the user was actively using it and/or (2) exclude an app which crashes on startup from pre-launch. It will be appreciated that other rules and/or heuristics may be employed for crashing apps—or in service of these and/or other terminations scenarios.

One Paradigm Use Example

Figure 4:
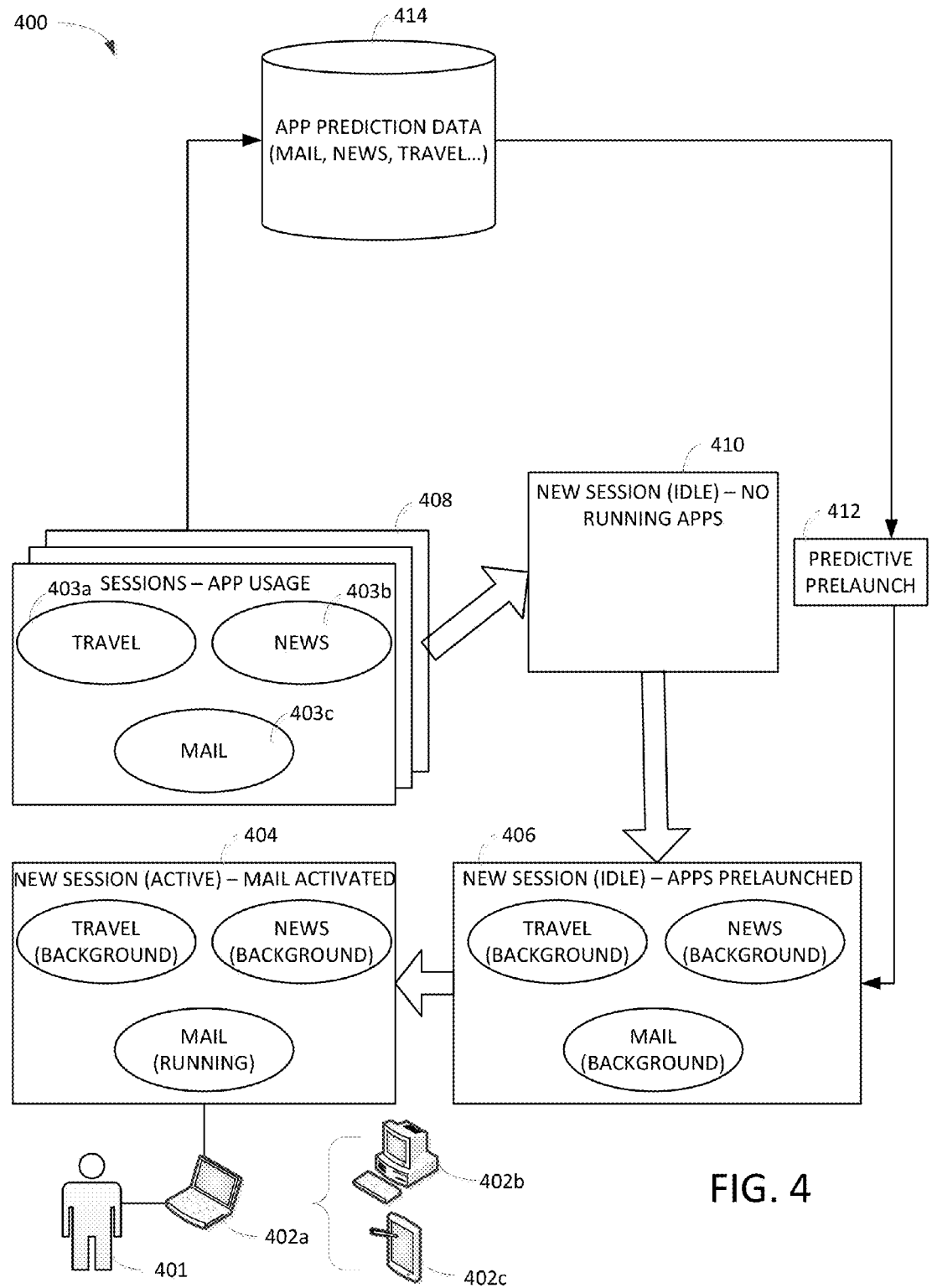
FIG. 4 depicts a paradigm example to illustrate the use of the present systems and methods.

In order to gain a better appreciation for the present systems and methods, FIG. 4 depicts one paradigm use example of the present systems and methods. User 401 may be using a computer system 402a (e.g., smart device, tablet, laptop, desktop or the like)—and typically likes to use at least three apps—e.g., travel app 403a, news app 403b and 403c—when logged on to the computer system.

These apps may be managed—via the operating system of computer system 402 and in concert with the present system of pre-launching apps—to provide the user with a better user experience, with faster launching apps and/or better utilization of computer system resources.

Session module 408 may maintain data and/or metadata on prior sessions usage of the apps (e.g., 403a, 403b and 403c). Such data/metadata may be stored or uploaded (in the case of remote access) to inform database or storage 414 of such usage. This data/metadata may be accessed by Predictive Pre-launch module 412.

As depicted in FIG. 4, at a first time, there may be a New Session 410 initiated (e.g., perhaps on computer system start up by the user or otherwise). In such a case, perhaps there are no running apps at that time. Predictive Pre-launch module 412 (e.g., in consulting with user's usage data and the set of rules and heuristics that it employs to decide pre-launch apps) may decide to pre-launch the Travel, Mail and News apps into the background—even before the user has commanded the activation of these apps. These pre-launched apps are shown in new Session 406 (which is in IDLE state).

After a while, perhaps the user may activate the Mail app (which may transition to Running from Suspended in the background). The Session 404 then may transition to an ACTIVE state from IDLE at this time.

In other embodiments of the present system, it may be possible, if not desirable, to extend the present system from a single computer system to other computer systems that the user may own, use and/or access. For example, in another embodiment, the data and/or metadata of user's app usage pattern may be shared with other computer systems (e.g., 402b and 402c) that the user may own and/or access. If these other computer systems have the present system either installed, or may have access via a client-server or other suitable model, then such predictive pre-launching may migrate and follow a user from computer system to computer system.

For example, as the user accesses and uses the computer system 402a, the user may be surprised to learn that frequently-used mail, travel and news apps are faster loading on computer systems 402b and 402c.

In addition, for apps that need to access data outside of his computer system—e.g., his News app, which needs to update content, typically via the Internet or other remote data sources, the user may also notice that his News app displays the latest stories substantially instantly on launch, and the "downloading" indicator hardly takes any time on the screen. In one embodiment, the present system may identify such apps that need outside data and/or metadata on a regular basis—and actively retrieve such outside data/metadata, depending (perhaps) on the availability of computer resources to retrieve such data, without negatively impacting currently running apps.

In another embodiment, the same improved user experience may be possible for periodic updates. For example, the user may get a new computer system. The user may download and install apps from an online app store. One of the factors contributing to popularity of apps is the ability of developers to offer frequent updates for their apps, fixing bugs and adding new features. Whenever the user sees a notification for updates at the online app store, the user selects the option to install all updates. As the updates complete, the user launches the newly updated apps to try out the new features. The user may see that the updated apps still appear in his currently running apps list and launching them is fast and seamless.

Embodiments of Prediction Engines

There are many different possible embodiments for a suitable prediction engine. In one embodiment, a prediction engine may utilize a prediction model (as discussed further below) that may consider an individual application and/or a group of applications that may be activated by the user. Such a model may determine a probability and/or some other measure for when an application may be activated by a user. As mentioned, these models may factor in various data and/or signals—e.g., order and frequency of past application usage, time of day, time of week, at a new application installation—among the other factors discussed herein. Initial prediction data may be seeded from a variety of sources—e.g., usage data collected from a community and/or aggregated data/metadata and application usage data on a machine being upgraded, or a new machine that the user may access. Such predication data may also be preserved across system backups/restores and/or computer system refreshes.

For example, the following is a set of possible Predictors for the purposes of the present application:

(1) Most Common Predictor

This predictor may return a probability of 1.0 for the top 20 most frequently activated apps and 0.0 for all others.

(2) Most Used Predictor

This predictor may return a probability of (Total Usage Time for App)/(Total Usage Time for All Apps).

(3) Null Predictor

This predictor always returns a probability of 0.0. In this case, the present system would not make use of any prediction value assigned to apps; but may nonetheless apply desired rules and/or heuristics for the pre-launching of apps.

(4) Adaptive Predictor

This predictor may identify application usage situations in the past that are similar to—and compare them with—the current situation by considering the current foreground app, the last foreground app and how long the current app has been in usage. Once it has identified these situations, the predictor may return the percentage and/or measure of situations which resulted in the queried event (and/or application being activated) occurring within the prediction window.

Figure 5:
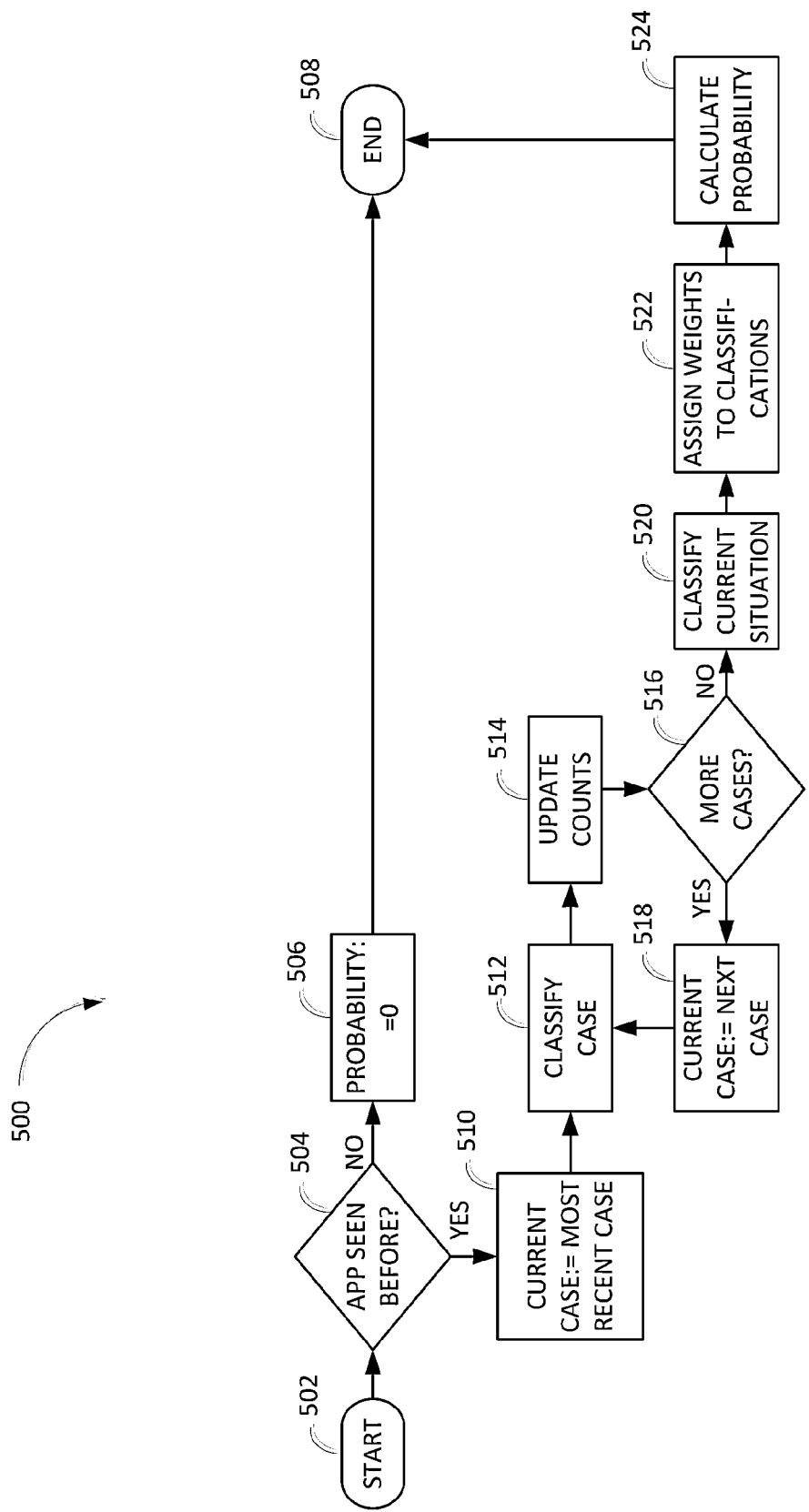
FIGS. 5 and 6 depict one embodiment and one paradigm example of an adaptive predictor that may be employed in some embodiments of the present application.
Figure 6:
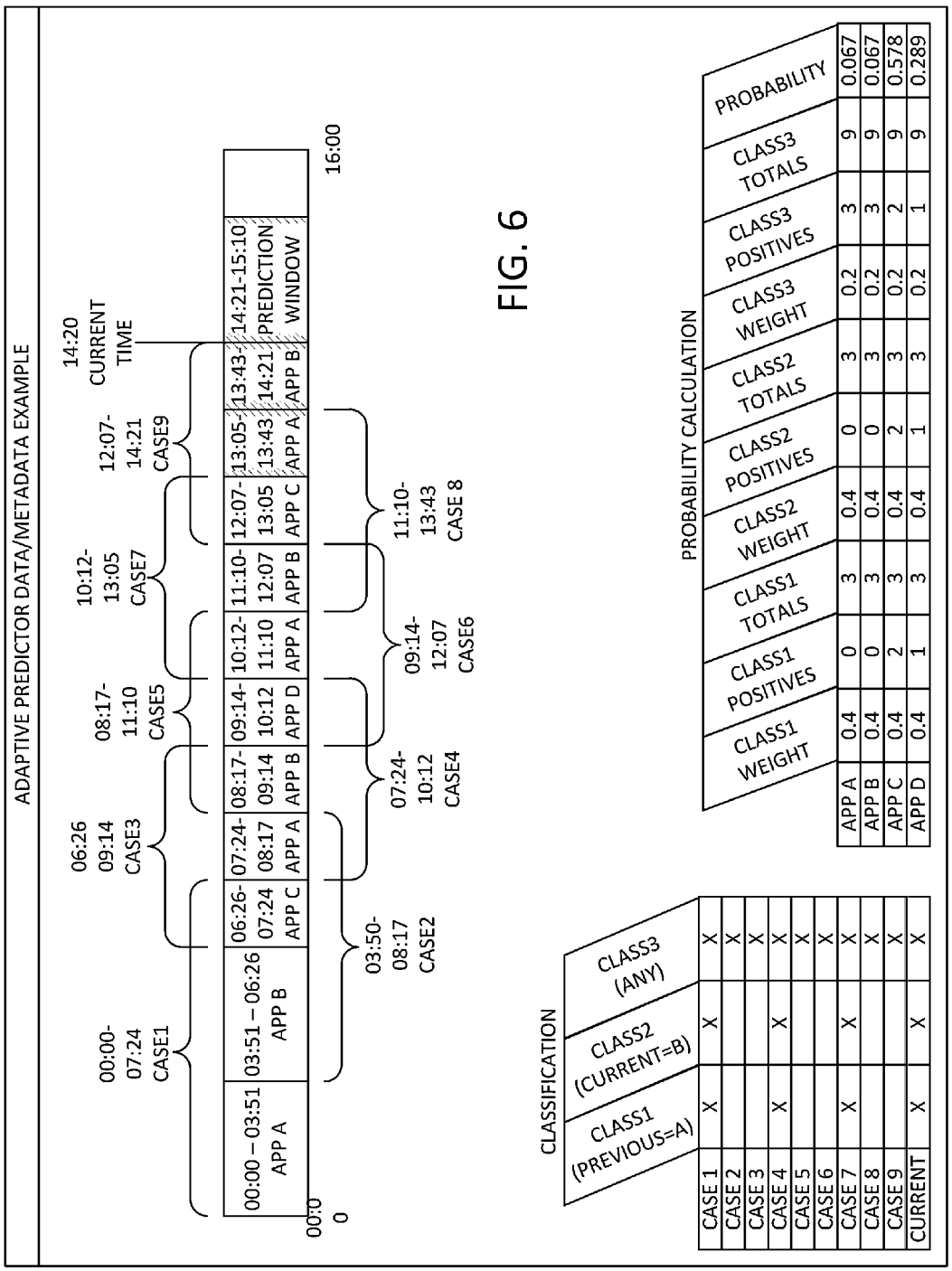

In reference to FIGS. 5 and 6 (and in many embodiments), the adaptive predictor may operate on groupings of application usage periods, referred to as "cases". As shown in FIG. 6, one manner of creating cases may be affected by taking groups of (e.g., 3 or any desired number) adjacent application usage periods. It will be appreciated that it is also possible to create cases using other groupings such as current app switch, previous app switch, and any period that falls within the prediction window after the app switch.

To determine the probability of "App X" being switched to in the next prediction window, the predictor may iterate over all of the cases and classify each of them based on their properties. Once the case is classified, the present system may adjust the counts for each class the case matches. Each class may have a count of positive cases and a count of total cases. A case is "positive" if App X is switched to within the case.

Once such cases have been classified and counts updated, the present system may determine which classes the current situation matches and assign weights to the classes. These weights could be static or could depend on factors such as the number of total cases in a class and whether the current situation matches the class—e.g., assign weights (such as, 0.4, 0.4, and 0.2). Once weights have been assigned, it may be possible to compute a final probability by taking the weighted sum of (Positive Cases)/(Total Cases) for each class.

FIG. 5 gives one embodiment for an "adaptive" prediction engine module as made in accordance with the principles of the present application. Prediction engine module may receive activity data of a given app's lifecycle (e.g., the number of times an app is activated by a user, the time of day of activation, length of time of activation, and the like). These uses of an app may form a set of "cases" of use of an app. Each case may be assessed a calculated, predicted and/or estimated probability of future and/or potential activation.

Adaptive prediction may start at 502 and if the app being considered by the prediction engine has never been seen before (at 504), then the probability of the app needing pre-launched may be given an initial value—e.g., zero (at 506) and the process may end at 508.

Otherwise, the app has been seen and/or considered before. This occurrence may be set as the most recent case (at 510) of this app. Adaptive prediction may classify this current case (at 512) and update the count for this case (at 514). The engine may consider whether there are any further additional cases to consider at this time (at 516) and, if so, the engine may increment the current case appropriately (at 518). When all current cases have been considered, then the engine may classify the current situation (AT 522).

In some embodiments, the "current situation" may comprise the current app, the previous app and how long the system has been in the current app. It is possible to extend this concept from the last 2-3 apps to the last N apps. When calculating probability, the adaptive predictor may consider previous cases similar to the current situation and looks at which app has been used after those cases. In one embodiment, the "adaptiveness" may come from the fact that the algorithm isn't rigid about finding exactly the same situation in the past—e.g., if there is not a sufficient number of examples in the past similar to the current situation, the algorithm may relax the definition of the "current situation" and make it less specific by considering N−1 most recent apps and/or by generalizing how much time is spent in the current app.

When the data has been so classified and/or processed, the engine may then calculate the probability of potential activation (at 524), based on desired rules and heuristics. Such rules and/or heuristics might comprise: a time weighted average of the amount of time the app is running, the time of day in which the app is activated and/or running or the like.

FIG. 6 depicts one exemplary set of data/metadata that may be maintained by an adaptive prediction module, as depicted in FIG. 5. This data/metadata may be stored as appropriate, either within the computer system or external to the computer system. As may be seen, this example considers the data of four apps (i.e., A, B, C and D) over the course of a desired period of time. It will be appreciated that the period of time may be varied according to the desire of the present system—e.g. a day, a week, etc.

In this example, from time=00:00 until 14:20 (the Current Time of the example), there are a number of cases (Case1, . . . , Case 9) that are considered by the present system. These cases may represent periods of overlapping time (e.g., Case1 and Case2, etc.)—or they may be non-overlapping, as desired. Each Case may commence upon some signal—e.g., the activation and/or use of an app (e.g., that moves an app from suspended to running). In this example, it may be seen that last Case is the current situation (and as shown in hatching) and Cases1-9 represent historic entries.

As these Cases are processed, each case may be classified into any number of Classes. Each Class may be pre-defined as a use case and/or model of the user (e.g., which may vary depending on whether the user is at work, in what activities the user is engaged, or the like). The adaptive predictive engine may continue to process these cases—e.g., to provide predictions for the Prediction Window (which is shown as a desired time period past the current time).

This Classification data may be used to perform the probability calculation for possible weights. As may be seen, the final probabilities may be calculated and/or estimated as possibly pertaining to the desired Prediction Window.

Once these probabilities have been set, they may be utilized by other modules of the present system—e.g., Pre-launch Policy—as a part of the rules and/or heuristics to determine whether to pre-launch a given app or not.

(5) Switch Rate Predictor

In this embodiment, it may be possible to provide a model based on individual and/or community data that uses possibly generic attributes like switch frequency and time in the app to make its predictions.

Figure 7:
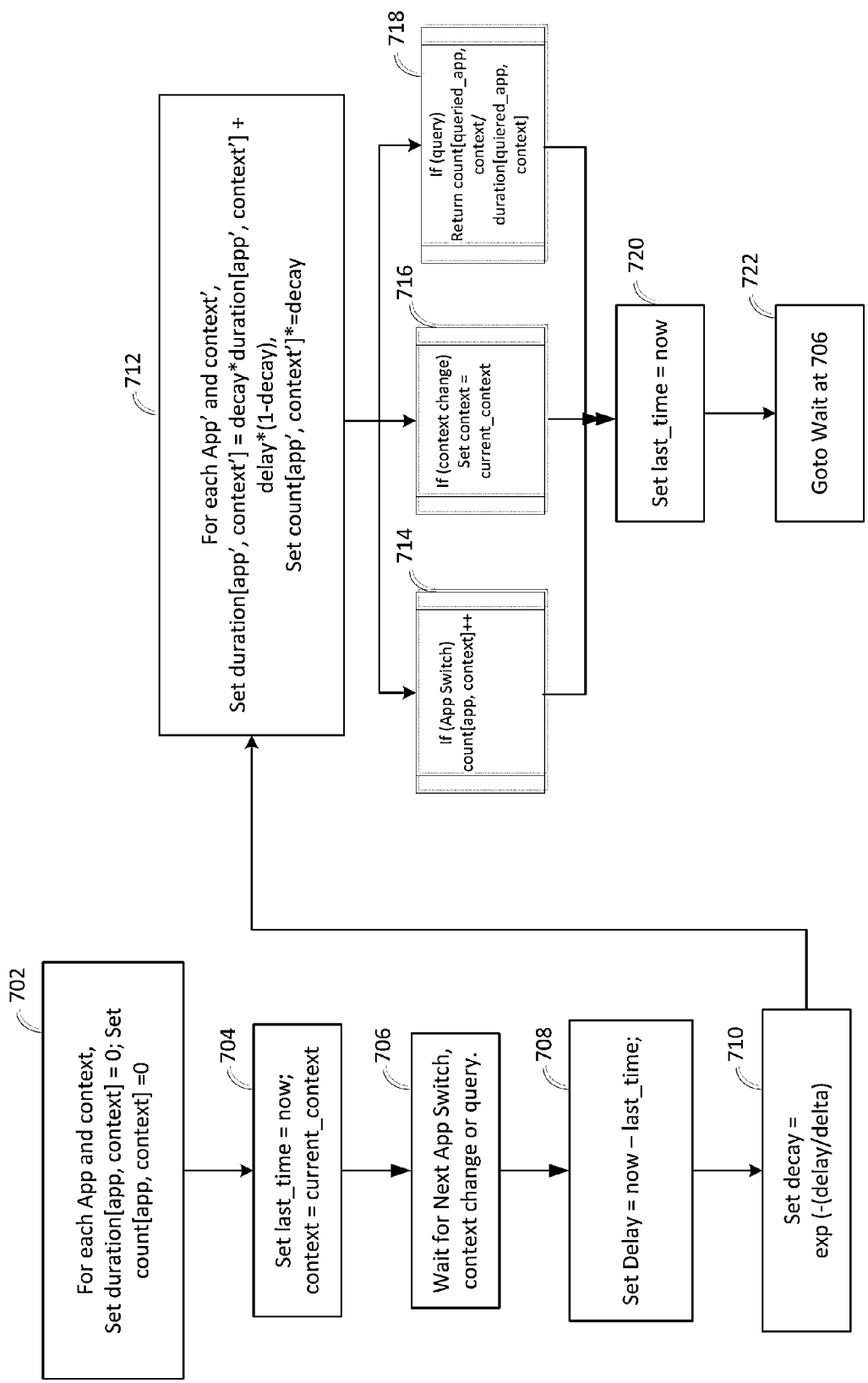
FIGS. 7 and 8 depict one embodiment and one paradigm example of a rate predictor that may be employed in some embodiments of the present application.
Figure 8:
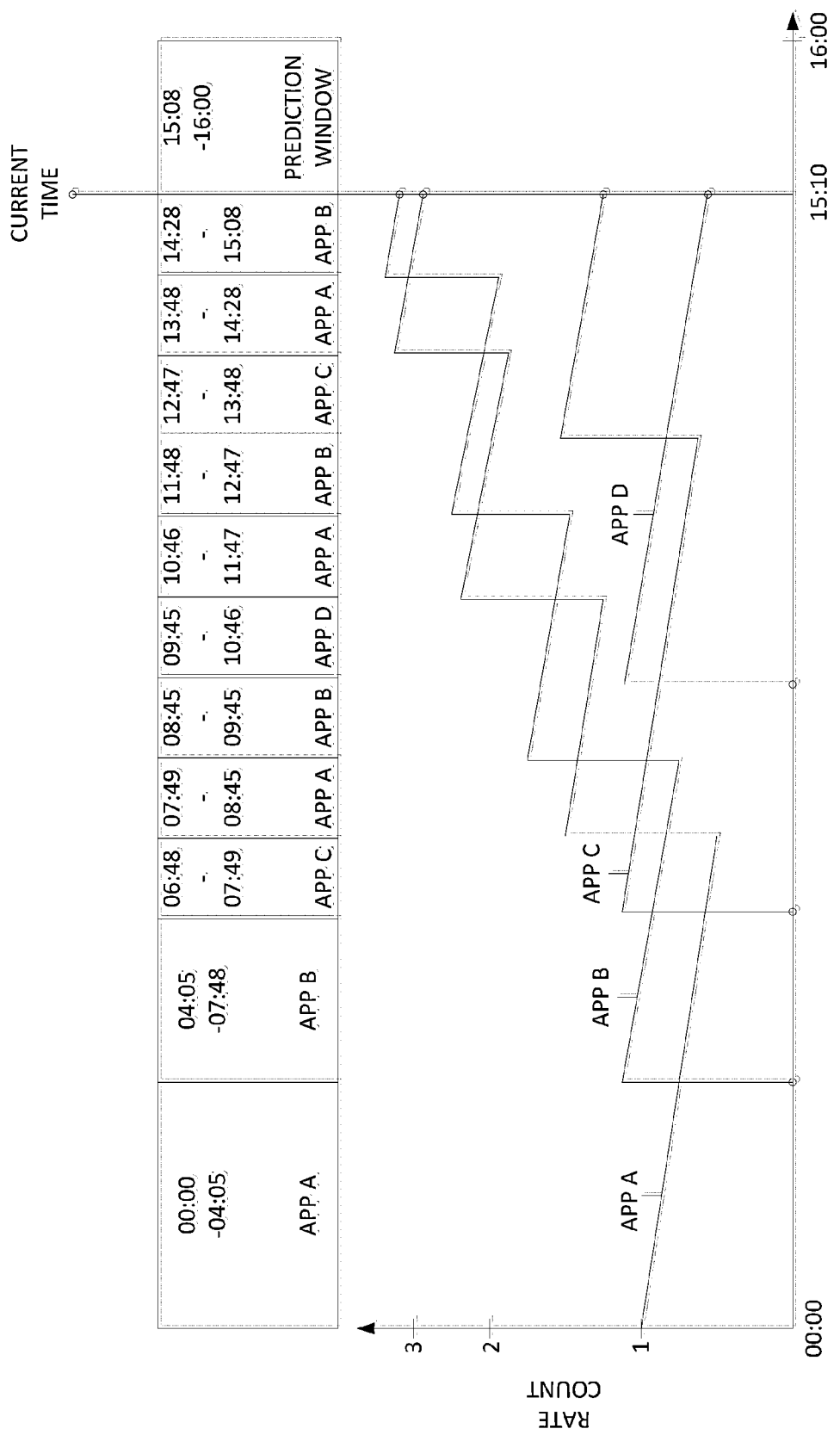

In reference to FIGS. 7 and 8, one rate predictor may operate on app switches. Such a rate predictor may iterate over and/or consider all app switches in the history and maintain a variety of information—e.g., Rate Counts and Durations. Rate counts and durations may be divided into classes, for example it is possible to keep separate counts and durations for different times of day.

In one embodiment, for every app switch, the predictor may first decay all of the counts and durations. This may be done by applying an exponential decay based on the time since the last app switch; however other possible decay functions do exist.

Once the decays have been applied, the present system may classify the app switch and increment the corresponding rate count. The present system may then classify the time leading up to this app switch, possibly splitting the time period between different classes and add the times to the corresponding durations. For example, if the classes are Before Noon and Afternoon, the current time is 12:30 and the last app switch was at 11:00, the present system may add 1 hour to Before Noon and 30 minutes to Afternoon.

Once the present system has processed the application switches, the present system may classify the current situation. The present system may then assign weights to each class and compute the weighted sum—e.g., of (Rate Count)/(Duration) for each class. This gives the present system a final rate which may then be converted into a probability.

Additional Rate Predictor Embodiments

In one embodiment, the rate predictor attempts to estimate the probability that an event of interest (say, e.g., the user switching to the browser application) will occur within some interval $\delta$ of the current time t. That is, to answer the question "what is the probability that the event will happen between time t and t+$\delta$?" If the predictor know that, on average, the event happens at a rate of $\lambda$ events per unit time, this probability can be computed as $p = 1 - e^{-\delta \lambda}$. The predictor may therefore focus on estimating the rate $\lambda$ of the event at each time.

Embodiment 1: Overall Rate Predictor

If the predictor has observed the user for a duration d and the event occurred n times, the natural estimate is to use $$\lambda = \frac{n}{d}.$$

If $t_0$ is the time that the predictor starts observing the user, $t_i$ are the observed times of target events, and t is the current time, the predictor may employ:

$$n(t) = \sum_{i : t_0 < t_i < t} 1$$

$$d(t) = \int_{t_0}^{t} 1 d\tau = t - t_0$$

giving $$\lambda(t) = \frac{n(t)}{d(t)}$$

Embodiment 2: Per-Context Rate Predictor

Suppose the predictor knows that the rate may have different contexts. For example, suppose the rate is different on different days of the week. Then, if t="13:21.02, Friday, May 31, 2013" it may be possible to use:

$$\lambda = \frac{\text{number of events observed on Fridays}}{\text{duration the user was observed on Fridays}}$$

If the rate of the event of interest is different within the first minute of logging in, it is possible to use:

$$\lambda(t) = \begin{cases} \dfrac{\text{number of events observed within 1 min of login}}{\text{duration the user observed within 1 min of login}} & \text{if } t \text{ is within 1 min of login} \\ \dfrac{\text{number of events observed after 1 min of login}}{\text{duration the user was observed after 1 min of login}} & \text{if } t \text{ is after 1 min of login} \end{cases}$$

In general, if the context (e.g. day of week, hour of day, or whether within or after some time of login) at time t is c(t), it is possible to compute the number of times the event of interest is observed in each context c (e.g. on Sunday, Monday, . . . , Saturday), which may be denoted by $n_c(t)$, and the total duration the user in each context c is observed, which may be denoted by $d_c(t)$, and use:

$$\lambda(t) = \frac{n_c(t)}{d_c(t)} \text{ when } c(t) = c$$

If $I_c(t)$ is a function that is equal to 1 when the context is 1 and zero otherwise, it is possible to use:

$$n_c(t) = \sum_{i: t_0 < t_i < t} I_c(t_i)$$

$$d_c(t) = \int_{t_0}^{t} I_c(\tau) d\tau$$

Embodiment 3: Decayed Rate Predictor

As t grows, the counts $n_c(t)$ and durations $d_c(t)$ grow larger and larger, and become dominated by more and more out of date user behavior. To overcome this problem, it is possible to introduce recency-weighting so that more recent behavior is weighted more heavily in the counts and the durations. One option may be exponential weighting, where behavior at a time $\tau$ is given weight $$e^{-\frac{t-\tau}{\Delta}}$$

when evaluating counts and durations at a later time $\Delta$. In this case, it is possible to use:

$$n_c(t) = \sum_{i: t_0 < t_i < t} I_c(t_i) e^{-\frac{t-t_i}{\Delta}}$$

$$d_c(t) = \int_{t_0}^{t} I_c(\tau) e^{-\frac{t-\tau}{\Delta}} d\tau$$

$$\lambda(t) = \frac{n_c(t)}{d_c(t)} \text{ when } c(t) = c$$

If events (in this case app switches), changes in context (e.g. Changes in day), and queries (i.e. PLM querying the predictor) occur forwards in time, then these counts, rates, and durations may be computed shown in flowchart form in FIG. 7 and repeated here below:
1. Foreach app and context: set duration[app, context]=0 set count[app, context]=0 (702)
2. Set last_time=now, context=current_context (704)
3. Wait for next app switch, context change or query (706)
4. Set delay=now−last_time (708)
5. Set decay=exp(−(delay)/delta) (710)
6. For each app' and context': set duration[app', context']=decay*duration[app', context']+delay*(1−decay), set count[app', context']*=decay (712)
7. if (app switch) count[app, context]++ (714)
8. if (context change) set context=current_context (716)
9. if (query) return count[queried_app, context]/duration[queried_app,context](718)
10. Set last_time=now (720)
11. Go to 3 (722)

FIG. 8 depicts one exemplary set of data regarding four apps (A, B, C and D) that shows the switches between the various apps over time. For example, consider the rate curve labeled "App A" in FIG. 8. It starts with a rate count of 1 at time 00:00—as App A is activated and running at that time. The slope of that curve is less than one—showing that a decay rate is being applied over time. Such a decay rate may depending on heuristics (e.g., the longer time between switches for an app, the less "popular" the app is for a user). It will be appreciated that—even though the decay rate is shown as a linear decline, there may be more complicated decay rates and/or functions to reflect a different model and/or heuristic.

At time 07:49, App A is activated again and the rate count is a step up from where it was. The final value for App A could be 2 or less, depending on decay rates being applied. Similar step ups occur for App A at times 10:46 and 13:48—and decay rates are thereafter applied.

The same sort of description may be applied to each App B, C and D in a similar fashion. These rate curves may then be applied by the pre-launch module according to some rules and/or heuristics—e.g., certain apps have a switch rate over some threshold may be pre-launched.

Embodiments of Pre-launch Policy

In many embodiments, pre-launch policy module may determine a variety of actions—e.g. (1) what triggers prediction to be run; (2) determining the apps which should be activated through pre-launch; and/or (3) how the pre-launch behaves with changing power states and system resource usage of the computer system.

There are a number of potential pre-launch policies available to the present system. For merely two examples, the present system may adopt: (1) a simple pre-launch policy and (2) an aggressive pre-launch policy.

For the simple pre-launch policy, it may be desirable to pre-launch all apps that have a probability of being launched within the pre-launch prediction window above a desired probability threshold and/or bar. It may be desirable to pre-launch as many apps as can fit in memory without triggering a PLM policy and to perform pre-launches in decreasing order of probability. For one example, it may be possible to pre-launch as many apps as can fit it memory and avoid pushing the system over the threshold where it might start terminating previously running applications.

For a more aggressive pre-launch policy, it may be desirable to selectively pre-launch apps that meet a desired probability threshold/bar—e.g., with the exception that it does not try to avoid the PLM being triggered. In one such case, the pre-launch policy module may launch such apps until memory is full. For example, one aggressive prelaunch policy would pre-launch of an app may occur if its usage probability is higher than any of the currently running/suspended apps. Thus, the system may keep the apps with the highest probabilities running/suspended.

In many embodiments, the prediction engine and pre-launch policy modules may not always be running and may control their own scheduling. In one embodiment, these modules may be run at desired intervals. For example, if the computer system is not in connected standby, prediction engine module may be run at a fixed interval (e.g., at 15 minutes intervals or the like). This interval may vary or be reduced, if prediction is not considered to be an inexpensive process. In addition, the prelaunch module may be explicitly triggered during various points such as user logon, resume from sleep/hibernate, etc.

When the computer system is in connected standby, there are a number of options for triggering prediction:

(1) Use prediction to determine when the computer system may come out of connected standby, and proactively run prediction and pre-launch before the computer system comes out of connected standby;

(2) Run prediction and pre-launch when the computer system comes out of a "Quiet Mode". Quiet mode may be a configurable period of time (e.g., typically in the middle of the night) where no background tasks are allowed to run in order to conserve battery life. It may be desirable not to run prediction when the computer system is in Quiet Mode.

(3) Run prediction at a longer interval when the computer system is in connected standby.

If the computer system comes out of connected standby before prediction has been run, then it may be desirable to run prediction on the state transition out of connected standby. If the app being activated by pre-launch is throttled, the impact on user experience may be minimal.

One instance of throttling may be in the context of GPU throttling. In this case, it is possible to model GPU throttling in the following manner.

The graphics kernel maintains an "interference counter" per process. This counts the number of times a GPU packet/command from a foreground process had to wait because the GPU was busy processing a command from the target process. Alternatively, it may be possible to keep tracking of how much GPU time is taken up by this process. In addition, the graphics kernel also maintains an overall GPU utilization metric that can be queried from user mode.

When the present system decides to pre-launch an app, it may first wait for the overall GPU utilization to quiet down (e.g., in a similar way, like waiting for the CPU and disk to quiet down as well). During pre-launch, the present system may frequently query the interference counter for the pre-launching app. Alternatively, instead of polling, it may be possible to get a notification when the interference counter reaches a certain value.

If interference is detected, the app being pre-launched may be temporarily "paused" which means its threads are suspended. The app remains in the paused state until either the overall GPU utilization comes back down or until it stays in the paused state for a threshold amount (e.g., a few seconds—or some desired threshold to avoid network connection failures).

When it leaves the paused state, the app continues the pre-launch where it left off. If there is GPU contention, the app may toggle between the active and paused states. Eventually, it will either complete its pre-launch or the present system may decide against pre-launch if the app's aggregate time in the paused state went beyond some threshold (e.g., there's too much GPU contention). In such a case, the app may be suspended. Alternatively, GPU throttling may be achieved by assigning low priority to background GPU packets such that foreground packets may preempt—as may be done similarly for CPU, I/O, and memory.

When the pre-launch policy has determined that one or more apps are to be activated through pre-launch, these apps may be added to a pre-launch queue. In one embodiment, there may be many ways for an app to get into the pre-launch queue:

(1) prediction determines that an app should be added to the pre-launch queue. This determination may be based on the probability threshold returned by the prediction algorithm; and/or (2) a system component (e.g. servicing) requests a pre-launch.

In one embodiment, apps in the pre-launch queue may be serialized for pre-launch. In addition, it may be desirable to take into consideration system resources (e.g., memory utilization, CPU utilization, GPU utilization battery state of charge, I/O utilization) before activating each app through pre-launch. Depending on the performance specifications of the computer system, rules and/or heuristics may be applied that factor into consideration available system resources and the potential impact to the user experience should pre-launch occur at a time of low available system resources.

For merely some examples, there may be rules and/or heuristics that apply threshold testing—e.g., if a given system resource or combination of system resources are below a given threshold of availability to the computer system, then pre-launching may be suspended or dynamically curtailed, until there is a change in the availability of certain resources. Such rules/heuristics may be modified by a high prediction of an application activation by the user. Thus, if the present system rates a particular activation as high or imminent, then any threshold depending on system resource availability may be dynamically changed—and imminent activations may be pre-launched on a lower availability of system resources. It will be appreciated these examples are merely meant for expository purposes and that the scope of the present application is not to be narrowed by their recitation herein.

As mentioned previously, if pre-launch of an app fails for a known reason (e.g., app already running), the app may be taken out of the queue (e.g., blacklisting the application), and may be added again in future based on prediction or external request.

Alternatively, if pre-launch of an app fails due to app crashing on startup or getting terminated due to GPU glitches, there may be several options for the present system to pursue:
  (1) the app may be blocked from the pre-launch queue until the app gets an update; and/or
  (2) it may be possible to retry to pre-launch the app a desired number of times before blocking the app.

Pre-launch Success Metrics

In some embodiments, it may be desirable to have a manner of measuring the success of Predictive Pre-launch for a computer system. It may be desirable to define one or more success metrics to gauge the performance of predictive pre-launch on the user experience. For example, the following may be suitable metrics:
  (1) a measure of the percentage reduction in fresh app launches (without pre-launch); and/or
  (2) a measure of the percentage of apps activated by pre-launch that are killed before getting used.

In one embodiment, these metrics may have a threshold value set and, if system performance falls below a desired threshold, then certain actions may be taken—e.g., dynamically changing the preference for pre-launching apps or the like.

Pre-launch Bootstrapping

In one embodiment, it may be desirable provide a pleasing "first run" experience for the user—i.e., fast performance upon startup of a new computer system. To provide such an experience, there are a number of options for the present system:
  (1) use inbox app data from some source (e.g. application usage telemetry, SQM or the like); and/or
  (2) give OEM's a way to provide the initial data.

In such options, it may suffice that the specific user's app preferences are made available to the present system on the new computer system. Alternatively, it may suffice to have a more generic user's preference—e.g. from community data (perhaps sourced from app usage telemetry, SQM or the like) to bootstrap the predictor.

Accuracy and Coverage Metrics

In some embodiments, it may be desirable to employ two other metrics for pre-launch—i.e., Accuracy and Coverage. Accuracy is a measurement of how accurate the policy, predictor pair was, the higher this value the less waste. Coverage is a measurement of how much benefit was provided. By calculating these values for each probability threshold/bar, the present system may dynamically alter relationships between these values and any tradeoffs that may be desirable in light of such metrics.

For pre-launch, accuracy may be defined as the percentage of pre-launches which are used,—e.g., that is the app is switched to before the pre-launched instance is terminated. Coverage may be defined as the percentage decrease in application switches that are launches relative to the baseline. For example, it is possible to define:

Accuracy=(Pre-launch Hits)/Prelauches

Coverage=(Baseline AppLaunches-App Launches With Pre-launch)/(Baseline AppLaunches)

Various Prediction Embodiments

In many embodiments, present systems may employ a set of prediction models which may tend to give the probability of a user using an application (e.g., prediction data). Predictions may be based on various signals including:
  (1) Order and frequency of past application usage;
  (2) Time of day;
  (3) Day of week; and/or
  (4) New app installation.

In addition, several present systems may "seed" initial prediction data from:
  (1) Anonymous data collected from a community of users; and/or
  (2) Application usage data on a computer system being upgraded or from an older (possibly different) computer system. This may be useful when a user is accessing a new and/or upgraded computer system; but may still expect to experience the fast launching of application afforded by many embodiments of the present application.

In many embodiments, present systems may preserve this prediction data across many types of events, including backup/restore events and computer system refresh.

Alternative Embodiments—Use Cases and Workflow

The following are alternative embodiments of the present system and may be desirable from the standpoint of particular use cases and/or workflow.

It should be appreciated that, when making the decision about which apps to pre-launch, there may be other considerations, apart from probability of use of the application. For example, when the usage probability of two apps A and B are "close", the pre-launch service may look at other metrics such as application "size" to determine which one to pre-launch first. So, the system may implement policies—e.g., fitting into memory the most likely apps that may get used.

Predictive Pre-Launch on First Use

This may be a sequence followed on first use of the computer system:
  (1) Default pre-launch data is seeded in the computer system;
  (2) User logs in to the computer system;
  (3) The default data is used by predictor to get a list of apps to pre-launch;
  (4) The list of apps to pre-launch is queued;
  (5) Pre-launch component requests pre-launch for all apps in the queue;
  (6) The apps are activated by pre-launch;
  (7) User runs one of the apps which is already activated through pre-launch, and finds the startup time to be much faster than the startup time of same app on a computer system without pre-launch.

Continuous Predictive Pre-launch

This may be a sequence followed as the user uses the computer system:
  (1) Predictor is triggered at a regular interval;
  (2) User data is used by predictor to get a list of apps to pre-launch;
  (3) The list of apps to pre-launch is queued;
  (4) Pre-launch component requests pre-launch for all apps in the queue,
  (5) The apps are activated by pre-launch;
  (6) User runs one of the apps which is already activated through pre-launch, and finds the startup time to be much faster than the startup time of same app on the computer system without pre-launch.

Predictive Pre-launch on Transition to CS

This may be a the sequence followed when transition to CS takes place:
  (1) User presses the power button;
  (2) Predictor calculates the estimated time when the computer system may come out of CS;
  (3) At a given interval before the computer system is expected to come out of CS, predictor is triggered;
  (4) If the machine comes out of CS earlier, predictor is triggered on the transition out of CS;

(5) User data is used by predictor to get a list of apps to pre-launch;

(6) The list of apps to pre-launch is queued;

(7) Pre-launch component requests pre-launch for all apps in the queue;

(8) The apps are activated by pre-launch;

(9) When the machine comes out of CS, the user runs one of the apps which is already activated through pre-launch, and finds the startup time to be much faster than the startup time of same app on the computer system without pre-launch.

Predictive Pre-launch and Quiet Mode

This may be a sequence followed in Quiet Mode:

(1) computer system goes into Quiet Mode at night;

(2) Predictive Pre-launch is disabled while the machine is in Quiet Mode;

(3) When the machine comes out of Quiet Mode, predictor is triggered;

(4) If the machine comes out of Quiet Mode earlier, predictor is triggered on the transition out of Quiet Mode;

(5) User data is used by predictor to get a list of apps to pre-launch;

(6) The list of apps to pre-launch is queued;

(7) Pre-launch component requests pre-launch for all apps in the queue, (8) The apps are activated by pre-launch;

(9) When the user starts using the machine, the user runs one of the apps which is already activated through pre-launch, and finds the startup time to be much faster than the startup time of same app on the computer system without pre-launch.

Predictive Pre-launch and App Errors

This may be a sequence followed for apps which fail on startup:

(1) Predictor is triggered at a regular interval;

(2) User data is used by predictor to get a list of apps to pre-launch;

(3) The list of apps to pre-launch is queued;

(4) Pre-launch component requests pre-launch for all apps in the queue;

(5) The apps are activated by pre-launch;

(6) One of the apps fails to launch due to some error on startup;

(7) The app is added to an "ignore list" by pre-launch;

(8) Next time the predictor is triggered, the app is excluded from pre-launch. In addition, the app may be removed from any "ignore" list, when the app is upgraded and/or reinstalled or when the system gets a notice that the user is successfully using the app.

Predictive Pre-launch and App Termination from PLM

This is the sequence followed by PLM to find out which apps to terminate:

(1) PLM requests a cost value for currently running apps from the service;

(2) Predictor and resource monitor work together to generate the cost and return it to PLM;

(3) PLM sorts currently running apps by this number, and terminates the ones on top of the list.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for pre-launching applications within a computer system the computer system comprising a controller, a memory and an operating system, the method comprising:

seeding the computer system with initial pre-launch prediction data for one or more applications, each application of the one or more applications configured to be activated by a user of the computer system, the initial pre-launch prediction data including data about the one or more applications and is derived from a source other than the user of the computer system;

creating a prediction model by combining at least some of the initial pre-launch prediction data with observation-based predictions of when at least one application of the one or more applications may be activated by the user in the future, the observation-based predictions including observing user utilization of system resources of the computer system over time;

monitoring system resources of the user computer system and applying one or more pre-launch rules to the one or more applications, the pre-launch rules considering at least one of the availability of system resources on the user computer system and the observation-based prediction model; and pre-launching at least one application of the one or more applications based upon the satisfaction of one or more pre-launch rules.

2. The method of claim 1 wherein the one or more applications are configured to be activated by a user comprising one of a group including: individual applications, applications that are used together by the user, applications that are used in a certain sequence, applications that are used at certain times of the day, applications that are used at regular intervals, applications used at a certain location and applications that are used in response to certain events in the computer system.

3. The method of claim 1 wherein the prediction model is one of a group including: modeling using most common application predictor, modeling using most used predictor, modeling using a null predictor, modeling using an oracle predictor, and modeling with a switch rate predictor.

4. The method of claim 1 wherein the prediction model includes an adaptive predictor model at least including:
identifying past application usage situations;
comparing the current application usage situation;
returning a measure that a queried application may be activated within a desired prediction window.

5. The method of claim 4 wherein the situations may comprise one of a group including: the current foreground application, the last foreground application and how long the current application has been in usage.

6. The method of claim 3 wherein modeling with a switch rate predictor further comprises:
maintaining switch rate data on an application over time; and
providing a measure for when the application may be likely to be switched.

7. The method of claim 6 wherein modeling with a switch rate predictor further comprises:
applying a decay rate to the switch data rate over time; and
changing the measure according to the decay rate.

8. The method of claim 3 wherein monitoring system resources further comprises:
monitoring a level of availability of the system resources to the computer system; and
wherein the system resources further comprise one of a group including: CPU utilization, GPU utilization, memory utilization, battery state of charge and I/O utilization.

9. The method of claim 8 wherein applying a set of pre-launch rules further comprises:
considering the level of availability of system resources to a desired threshold;
considering the prediction measure of when an application may be activated by a user; and
determining whether to pre-launch the application depending upon the satisfaction of conditions based on the level of availability and the prediction measure.

10. The method of claim 1 wherein each of the applications configured to be activated by a user comprises an associated process state, the associated process state comprises one of a group including: running, not running and suspended.

11. The method of claim 10 wherein pre-launching one application further comprises:
changing the associated process state of one application from not running to running.

12. The method of claim 11 wherein changing the associated process state of one application further comprises:
changing the associated process state of one application in the background of the computer system.

13. The method of claim 12 wherein changing the associated process state of one application further comprises:
activating said one said application to its last saved state with its backstack location restored.

14. The method of claim 1 wherein the method further comprises:
blacklisting a given application that has failed pre-launch in the past.

15. The method of claim 1 wherein the prediction model includes at least one of a frequency of application usage model, a time of day of application usage model, a location of application usage model, and an adaptive predictor usage model.

16. A system for pre-launching applications on a computer system, said computer system comprising a controller, a memory and an operating system, the system comprising:
a seed prediction module, the seed prediction module configured to seed the computer system with initial pre-launch prediction data for a one or more applications, each of the one or more applications configured to be activated by a user of the computer system, the initial pre-launch prediction data including data about the one or more applications and is derived from a source other than the user of the computing system;
a prediction engine configured to create a prediction model by combining at least some of the initial pre-launch prediction data with observation-based prediction of the likelihood that at least one application of the one or more applications may be activated by the user of the computer system in the future based on observing user utilization of system resources over time;
a pre-launch policy module configured to apply one or more pre-launch policy rules to the one or more applications the pre-launch rules considering at least one of the availability of system resources and the observation based prediction model; and
a pre-launch queue module configured to maintain a list of applications for pre-launching depending upon the satisfaction of one or more pre-launch policy rules.

17. The system of claim 16 wherein the prediction engine further comprises:
at least one prediction module, the prediction module comprising one of a group, the group comprising: a prediction module using most common application predictor, a prediction module using most used predictor, a prediction module using a null predictor, a prediction module using an oracle predictor, and a prediction module with a switch rate predictor.

18. The system of claim 17 wherein the system is configured to blacklist a given application that has failed pre-launch in the past.

19. A computer-readable hardware storage device storing instructions that when executed by a computing device, cause the computing device to perform operations comprising:
seeding the computing device with initial pre-launch prediction data for one or more applications, each application of the one or more applications configured to be activated by a user of the computing device, the initial pre-launch prediction data including data about the one or more applications and is derived from a source other than the user of the computing device;
creating a prediction model by combining at least some of the initial pre-launch prediction data with observation-based predictions of when at least one application of the one or more applications may be activated by the user in the future, the observation-based predictions including observing user utilization of computing device resources over time
monitoring system resources of the user computing device and applying one or more pre-launch rules to the one or more applications the pre-launch rules considering at least one of the availability of system resources on the computing device and the observation-based predictions model; and
pre-launching at least one application of the one or more applications based upon the satisfaction of one or more pre-launch rules.

20. The computer-readable hardware storage device of claim 19 wherein the associating a prediction of when the application may be activated further comprises:
- prediction modeling to give a prediction measure of when an application may be activated by a user; and
- wherein the prediction modeling is one of a group including: modeling using most common application predictor, modeling using most used predictor, modeling using a null predictor, modeling using an oracle predictor, and modeling with a switch rate predictor.

* * * * *